UNITED STATES PATENT OFFICE.

CONRAD SEMPER, OF PHILADELPHIA, PENNSYLVANIA, ASSIGNOR TO JOHN HARRISON, GEORGE L. HARRISON, JR., AND THOMAS S. HARRISON, ALL OF SAME PLACE.

REMOVING IRON FROM FERRUGINOUS SOLUTIONS.

SPECIFICATION forming part of Letters Patent No. 264,773, dated September 19, 1882.

Application filed February 3, 1882. (No specimens.)

*To all whom it may concern:*

Be it known that I, CONRAD SEMPER, of the city and county of Philadelphia, and State of Pennsylvania, have invented a new and useful method of freeing ferruginous solutions of certain salts from all or nearly all the iron they contain, which is fully set forth in the following specification.

The object of my invention is to eliminate the iron oxides from ferruginous solutions of any salt of the alkalies or alkaline earths, or of such metallic bases as are not precipitated by the treatment; and it consists in treating such solutions with manganic oxides, as hereinafter described. I accomplish this result by treating the solution, in the manner hereinafter more particularly described, with the black or brown oxides of manganese—*i. e.*, manganic dioxide or sesquioxide—either in their natural state or as obtained from manganic solutions—as, for instance, by the recovery of manganese in the Weldon process. If a ferruginous solution such as I have spoken of is treated with a sufficient quantity of manganic dioxide or sesquioxide, all or nearly all the iron will be precipitated, and after removing the insoluble parts the remaining solution will be entirely free from iron, or if not entirely free from it will contain only a slight quantity of iron. This solution can be then utilized in the usual way by either boiling it down till by hardening it forms a cake, or by evaporating to dryness, or by letting it crystallize, either alone or after the addition of such substances as may be desired to form the product—as, for instance, the addition of the alkaline sulphates to a solution of sulphate of alumina in order to form alum.

I do not confine myself to a specific temperature, but as the reaction takes place with sufficient rapidity in the cold I add the manganic dioxide or sesquioxide at the ordinary temperature of such ferruginous solutions.

It is also immaterial whether the ferruginous solutions to be treated are clear or whether they contain mechanically-suspended impurities. The ferruginous solutions of sulphate of alumina, for instance, may be treated in this way, although it may contain thus suspended in it silica and other decomposed raw material. It is not necessary to add to the solution any specific quantity or proportion of the manganic dioxide or sesquioxide, provided always enough is used to cause the iron oxides to be precipitated. This quantity will necessarily vary with the percentage of iron which the ferruginous solutions may contain. I have obtained very good results, for instance, by adding ten parts of manganic dioxide to a ferruginous solution of sulphate of alumina yielding one hundred parts of sulphate of alumina. In removing the iron from such ferruginous solutions a small quantity of the manganese may sometimes go in solution. When this happens it happens in this way: The iron in such solutions can only be precipitated in the ferric-oxide state. If it should be present as ferrous oxide, part of the manganic dioxide will be consumed in the oxidation of the ferrous oxide into ferric oxide, leaving a manganous oxide, as expressed in the following equasion: $2FeO + MnO_2 = Fe_2O_3 + MnO$; and this manganous oxide will be present in the resulting solution after the precipitation of the iron. It is desirable, therefore, to oxidize this ferrous oxide, when present, to ferric oxide, which can be done by any of the well-known oxidizing agents best adapted for use in the particular solution, as chloride of lime, nitric acid, bromine-water, or other oxidizing agent. It is also desirable, to prevent the presence of manganous oxide in the solution, to have the solution to be treated basic or neutral, or as nearly so as possible. These manganous salts, being almost colorless, will not interfere in obtaining from such solutions holding small quantities thereof a white product.

I will now describe more in detail the process of which I have given above a general description. Take, for example, a ferruginous solution of sulphate of alumina. I obtain a solution of sulphate of alumina in the well-known way, bringing together the ferruginous aluminous raw material and sulphuric acid. After the reaction has taken place and a ferruginous solution of sulphate of alumina has been formed, I preferably dilute the mass with a sufficient quantity of water or mother-liquor from a previous treatment to prevent it from hardening or crystallizing. I then add manganic dioxide or manganic sesquioxide, of which, in most cases, it will be sufficient to use about ten per cent. of the quantity of sulphate of alumina to be produced. I then stir the mixture briskly for a short time and take a sample of the solution. If the filtered solution of the same shows no or only a small quantity of iron the process is finished. If, however, the sample should still show iron to any considerable extent, some more of the manganic dioxide or sesquioxide must be added until a sample taken shows no or only a small quantity of iron. The separation of the insoluble parts is then done in any of the well-known ways—as by filtering, letting it settle, &c.—and the clear solution is then ready for utilization in the usual manner. The insoluble parts are then washed with water, and the weak or mother liquors resulting can be used, as stated above. The spent manganic dioxide can be freed from the iron with which it is combined by treating it with dilute sulphuric acid, or any other substance suitable to combine with the iron peroxide, and it can then, after washing, be used for a new operation. The spent manganic oxide, without freeing it from the iron, may be profitably used in the ordinary processes in which manganese is generally employed, such as in the manufacture of chloride of lime, &c. There are certain metallic bases which are precipitated with the iron in ferruginous solutions of the same, when such solutions are treated with manganic dioxide or manganic sesquioxide. By reason of this fact the treatment described is not applicable to such solutions.

Having thus described my invention, what I claim as new, and desire to secure by Letters Patent, is—

The process of removing iron from ferruginous solutions of any salt of the alkalies, alkaline earths, or such metallic bases as are not precipitated in the operation of the process by treating such solutions with manganic dioxide or manganic sesquioxide, substantially as described.

CONRAD SEMPER.

Witnesses:
CHARLES F. ZIEGLER,
J. WALTER DOUGLASS.